(12) United States Patent
Fishler et al.

(10) Patent No.: US 8,114,298 B2
(45) Date of Patent: Feb. 14, 2012

(54) METHOD, DEVICE AND SYSTEM FOR WATER TREATMENT

(75) Inventors: Theodore Fishler, Haifa (IL); David Feldman, Haifa (IL); Dietmar Werner, Wertingen-Hirschbach (DE)

(73) Assignees: Bromine Compounds Ltd., Beer Sheba (IL); WDT-Werner Dosiertechnik GmbH & Co. KG, Wertingen (DE)

( * ) Notice: Subject to any disclaimer, the term of this patent is extended or adjusted under 35 U.S.C. 154(b) by 401 days.

(21) Appl. No.: 12/309,947

(22) PCT Filed: Aug. 2, 2007

(86) PCT No.: PCT/IL2007/000965
§ 371 (c)(1),
(2), (4) Date: Jul. 1, 2009

(87) PCT Pub. No.: WO2008/015678
PCT Pub. Date: Feb. 7, 2008

(65) Prior Publication Data
US 2010/0006513 A1 Jan. 14, 2010

Related U.S. Application Data

(60) Provisional application No. 60/835,083, filed on Aug. 3, 2006.

(51) Int. Cl.
*C02F 1/76* (2006.01)
(52) U.S. Cl. ........ 210/744; 210/206; 210/753; 210/754; 210/755; 210/104; 122/266

(58) Field of Classification Search ............... 210/198.1, 210/206, 753, 754, 755, 756, 192, 744, 104, 210/205; 422/266, 261
See application file for complete search history.

(56) References Cited

U.S. PATENT DOCUMENTS

| | | | |
|---|---|---|---|
| 3,456,801 A * | 7/1969 | Bowles | 210/123 |
| 3,595,395 A | 7/1971 | Lorenzen | |
| 4,129,230 A | 12/1978 | Billett et al. | |
| 4,181,702 A | 1/1980 | Watson | |
| 4,288,430 A | 9/1981 | Etzel | |
| 4,293,425 A | 10/1981 | Price | |
| 4,538,744 A | 9/1985 | Weissenborn | |
| 4,584,106 A | 4/1986 | Held | |
| 4,732,689 A | 3/1988 | Harvey et al. | |
| 4,759,907 A | 7/1988 | Kawolics et al. | |
| 4,912,681 A * | 3/1990 | Halsey et al. | 366/152.2 |
| 4,938,385 A | 7/1990 | Hayashi | |
| 5,427,694 A | 6/1995 | Rugg | |
| 6,387,251 B1 | 5/2002 | Marsiglietti et al. | |
| 6,531,056 B2 * | 3/2003 | Hammonds | 210/87 |
| 6,544,487 B1 | 4/2003 | Ferguson et al. | |

(Continued)

FOREIGN PATENT DOCUMENTS
EP 0 751 097 A2 1/1997
(Continued)

*Primary Examiner* — Duane Smith
*Assistant Examiner* — Douglas Theisen
(74) *Attorney, Agent, or Firm* — The Nath Law Group; Susanne M. Hopkins; Ari G. Zytcer (57) ABSTRACT

A device, system and method are provided for treating water, in which a water treating agent is prepared and dispensed to an untreated drinking water source in discrete and consecutive control volumes enabling untreated water in the untreated water source to be treated thereby to provide potable water.

21 Claims, 2 Drawing Sheets

U.S. PATENT DOCUMENTS

| | | |
|---|---|---|
| 6,855,307 B2 | 2/2005 | Shane et al. |
| 6,998,057 B2 * | 2/2006 | Ferguson et al. .............. 210/739 |
| 2004/0154984 A1 | 8/2004 | Dafny et al. |
| 2007/0243265 A1 * | 10/2007 | Papageorge ................... 424/667 |
| 2008/0217260 A1 * | 9/2008 | Papageorge ................... 210/753 |
| 2010/0320157 A1 * | 12/2010 | Schnitzler ..................... 210/756 |

FOREIGN PATENT DOCUMENTS

| | | |
|---|---|---|
| GB | 2 403 947 A | 1/2005 |
| WO | WO 02/10074 A1 | 2/2002 |
| WO | WO 03/097537 A1 | 11/2003 |
| WO | WO 2004/041726 A1 | 5/2004 |
| WO | WO 2004/052794 A1 | 6/2004 |

* cited by examiner

METHOD, DEVICE AND SYSTEM FOR WATER TREATMENT

This application was filed under 35 U.S.C. 371 as a national stage of PCT/IL2007/000965, filed 2 Aug. 2007, an application claiming the benefit under 35 USC 119(e) U.S. Provisional Patent Application No.: 60/835,083, filed on 3 Aug. 2006, the entire content of which is hereby incorporated by reference in its entirety.

FIELD OF THE INVENTION

This invention relates to drinking water treatment technology and in particular to methods, devices and systems used for treating water for drinking.

BACKGROUND OF THE INVENTION

Worldwide, about a billion people lack access to safe, clean drinking water. A safe and adequate water supply is essential for the prevention of water borne diseases. Drinking water must be free of organisms and chemical concentrations that are hazardous to human health. It should be free of suspended particles, bad tastes, colors and smells.

Water treatment is the process of making impure water safe to drink and use. Treatment processes are often expensive and require regular attention. Basically, three water conditions need treatment: contaminated water containing disease-causing organisms (pathogens) thereby requiring disinfection; turbid water (water clouded with suspended matter) thereby requiring settling or filtration to obtain clear and clarified water; high mineral or salt containing water which impart the water with bad taste, color or odor thereby requiring conditioning of the water.

Chlorine is the most widely used chemical disinfectant for use in water treatment and is marketed in many forms. The chlorine added to the water reacts with organic and inorganic material as well as disease-causing organisms. The amount of chlorine that is consumed by the treated water is called the "chlorine demand". The amount of chlorine remaining in the water after the chlorine demand has been satisfied is called "residual chlorine".

The conventional chlorine-based water treatment compounds include elemental chlorine, sodium hypochlorite and calcium hypochlorite. Elemental chlorine, employed as chlorine gas, is known to be the most cost effective for providing disinfected water. While used extensively in urban treatment systems, it is not commonly available to rural communities because of its handling difficulties (pressurized containers) and safety problems.

Sodium Hypochlorite, or bleach, is more widely available, and can be manufactured locally, but its use is limited primarily because of a short shelf life (3-6 months). Calcium Hypochlorite (CalHypo), despite its lower transport costs, is an expensive and flammable substance that requires special handling and storage.

NaDCC (Sodium dichlor, Sodium dichloro-isocyanurate), a chlorine based chemical disinfectant has recently been approved by the EPA and the WHO for regular human consumption. The material is being used for field applications as a dry solid mainly in a tablet form. Solid NaDCC is highly unstable when moist. The solutions of NaDCC cannot be stored for long periods since their available chlorine content decreases slowly.

Other chlorine based chemicals include trichlorocyanuric acid (TCCA) which may be dosed into water, in the form of a tablet, using feeders (chlorinators) such as the HAYWARD automatic pressure style feeders.

To prepare water treating solutions, the solid chemical disinfectants are preliminarily dissolved in a separate vessel and the resulting mixture constituting the water treating solution is then taken out with suitable dosing pumps and fed into water to be treated. For example, GB 2 403 947 describes a drinking water chlorinating system comprising a container for solid chlorinating substance in tablets with a water nozzle therein connectable to water mains, a settling chamber disposed under the container, a feed chamber in fluid communication with an upper part of the settling chamber, the feed chamber having an outlet connectable to a collection water pipe via a high-pressure pump, the container having water-permeable bottom and being configured so that water emanating from the water nozzle washes the tablets and drips onto the water surface in the settling chamber. The tablets are continuously in a moist state reducing the effectiveness of treatment with NaDCC tablets (for reason such as those discussed above).

Other dosing systems are known. For example, a dissolving tank by Nalco provides a pesticide solution, made by providing water and a chemical agent (Towerbrom 960) directly to the tank during a feed cycle, which may use a dry agent feeding device as disclosed in U.S. Pat. No. 5,427,694.

By way of further example, the Granudos 45/100 system, which is a dosing system for granular calcium hypochlorite (the chemical) used for the disinfection of swimming pools. This device meters the chemical directly from the container (drum). The chemical is dosed into a dissolving system whenever the level of chlorine in the pool falls below a threshold, and the dissolving system is maintained topped up with water continually, either from the pool or from the mains, as required. A solution of the chemical is channeled to the pool, and acid is added in order to prevent precipitation and keep the pool water at the required pH value (7.2-7.6).

US Patent Application Publication No. 2004/0154984 describes a device for dissolution of a particulate material to provide water treating solutions (specifically, biocides) of constant concentrations.

A system for dosing dry flowable material into water is described in U.S. Pat. No. 4,912,68 1. Specifically, a system for creating an admixture from a liquid and a relatively dry flowable material is described, the system includes a hopper for the dry flowable material, a pipe, a pair of valves defining a metering section of the pipe, and a mixing tank into which the dry material and water are introduced. The valves are alternately operated in response to sensed liquid level in the mixing tank to deposit a predetermined quantity of the dry material into the tank, and when the latter occurs, the water is injected tangentially into the tank to create a homogeneous admixture.

U.S. Pat. No. 6,387,251 describes an apparatus for dosing a granulated or powdered material in water to form an admixture, which includes a dosing assembly with a water collecting tank hydraulically connected to inflows of unmixed water and to an outflow of the admixture to water to be treated. Unmixed water is tapped through a duct from an inflow and fed to a substantially tubular manifold, upwardly connected to tank. The material is delivered into the manifold, in which the material mixes with water tapped from the inflow through duct and an admixture discharges into a collecting tank.

WO 2004/041726 discloses a method for treating a body of water with maintenance doses of water treatment chemicals based on the volume of water to be treated.

The following publications are of general background interest, and disclose various types of water treatment devices and systems or related devices/systems: U.S. Pat. No. 6,544, 487 B1; WO 03/097537 A1; EP 0 751 097 A2; WO 02/10074 A1; U.S. Pat. No. 6,855,307 B2; WO 2004/052794 A1; U.S. Pat. Nos. 5,427,694; 4,938,385; 4,129,230; 3,595,395; 4,181, 702; 4,759,907; 4,732,689; 4,584,106; 4,538,744; 4,293,425.

SUMMARY OF THE INVENTION

Herein, the term "untreated water" relates to water that contains foreign substances, organic material (for example bacteria) or other impurities that render the water undrinkable. In the context of the present invention, the term "untreated water" also encompasses pre-treated water, i.e. water that has undergone some degree of purifying treatment, however, is still unsuitable for drinking.

Herein, the term "treated water" relates to water that has been treated with a water treating agent to provide a desired effect. In one aspect of the invention, this desired effect is to provide potable water, and thus the aforesaid treatment relates to purifying untreated water by means of the water treating agent to remove or render ineffective foreign substances, and/or organic material and/or other impurities that otherwise render the water undrinkable. In particular, such purification is directed at disinfecting the water by killing bacteria therein.

By "ingress" is meant the supply or introduction of water into a vessel or other volume.

By "water treating agent" or "water treating solution" is meant a solution comprising a chemical agent in relatively high concentration, wherein the solution may be used to treat a larger volume of untreated water, to provide treated water, in particular disinfected or potable water.

Thus, the system of the invention may be designed to prepare water treating solutions of various concentrations of the chemical agent, with various preparation rates by enabling and providing control of both the dosing of the sanitizing agent and untreated water flow rate into the vessel. On the other hand, by dosing constantly and mixing continuously the fixed volumes of water each with a fixed amount of particulate chemical (disinfecting) agent, a constant concentration of the chemical agent in the water treating solution thus prepared may be achieved. The water treating solution is then dispensed to the body of water requiring to be treated, at a rate such that the water treating solution has not yet had the time to decompose, and is thus substantially fully effective in the body of water.

The concentration of the chemical sanitizing agent in the water treating agent may depend on environmental conditions, such as the temperature at which the process is performed (e.g. the surrounding temperature). It is better for the surrounding temperature as well as other parameters to be selected, where possible, such that crystallization of the chemical agent in the vessel during storage of the water treating solution therein is avoided (e.g. when the system is inoperable and the vessel thus functions as water storage tank). By specific design and selection of the dosing amount in combination with the rate of consumption of the solution, it is possible in accordance with aspects of the invention to prepare water solutions of high concentrations of water treating agent even at low surrounding temperatures. According to one embodiment, the concentration of the water treating agent is such that at a surrounding temperature above 0° C. to avoid freezing of water, preferably around or above 5° C., where no crystallization or freezing of the chemical agent will occur. When using particulate NaDCC as the water treating agent, a preferred concentration is 10±1% with a crystallization temperature of above 2° C.

According to aspects of the invention, a device, system and method are provided for treating water, in which a water treating agent is prepared and dispensed to an untreated drinking water source in discrete and consecutive control volumes enabling untreated water in the untreated water source to be treated thereby to provide potable water.

The present invention relates to a system for treating water to provide potable water, comprising:
  a supply of chemical agent chosen from halogen generating agents, said chemical agent being capable of treating or disinfecting drinking water to provide potable water when a water treating agent comprising an aqueous solution is interacted with untreated water;
  a supply of water;
  a water treating agent preparation and dispensing device connectable to an untreated drinking water source, said device being configured for preparing discrete and consecutive control volumes of said water treating agent from said supply of water and said chemical agent, and for dispensing water treating agent thus prepared from said device to said untreated water source for enabling untreated water in said untreated water source to be treated thereby to provide potable water;
  wherein the device is configured for preparing a next control volume of said water treating agent after a current control volume of said water treating agent has been dispensed thereby.

Optionally, said system is configured for dispensing said water treating agent independently of whether a next control volume thereof is being prepared or has been prepared (i.e, the current control volume is being dispensed), said water treating agent having a concentration of said chemical agent sufficient for treating a substantially larger volume of untreated water therewith to render said larger volume potable.

In particular, the system may be configured for disinfecting water to provide disinfected water.

The supply of water may be provided by said untreated water source, for example. The system may be configured for preparing consecutive said control volumes of water treating agent at a rate, and for providing an amount of said chemical agent in each prepared said control volume, correlated to a volume flow rate and level of impurity of untreated water that it is desired to treat.

The magnitude of the control volume may be such as to enable said control volume to be dispensed within a dispensing time period that is generally less than a time period in which the said chemical agent decomposes in aqueous solution.

The chemical agent may comprise a halogen generating agent. The halogen generating agent may be a free halogen generating agent, a chlorine generating agent, or a free chlorine generating agent, for example.

The halogen generating agent may be chlorinated cyanurate selected from mono, di or trichloro isocyanurate, for example, and the chlorinated cyanurate may be selected from sodium dichloroisocyanurate (NaDCC), sodium dichloroisocyanurate dihydrate (NaDCC.2H$_2$O), potassium dichloroisocyanurate (KDCC), trichloroisocyanuric acid (TCCA), and mixtures thereof, for example. Further, the chlorinated cyanurate may optionally be anhydrous or dihydrated NaDCC.

The present also relates to a device for providing a water treating solution, comprising
  a vessel adapted for containing an aqueous liquid, said vessel being operatively connectable to a supply of untreated water and to a supply of chemical agent, said vessel comprising a treatment sub-system configured for interacting water provided thereto via said vessel with chemical agent provided directly to said sub-system responsive to said treatment sub-system being activated to provide a water treating solution therefrom to said vessel, said vessel further comprising a dispensing outlet; and a control system operatively connected to said vessel and configured for carrying out at least one preparation cycle for providing at least a dispensable control volume of water treating agent in said vessel responsive to a volume of water in said vessel being not greater than a minimum water volume, and for preventing ingress of untreated water to said vessel responsive to at least one of:

a volume of water including water treating agent in said vessel being not less than a maximum water volume, and a preparation cycle being terminated, said control volume being defined by a difference between said maximum water volume and said minimum water volume;

wherein during the or each said preparation cycle said control system is configured to allow ingress of untreated water and of a selectively controllable dose of said chemical agent into said device and for activating said treatment sub-system, each in sufficient quantity such as to provide a said control volume of water treating agent of desired concentration.

Optionally, said device is configured for dispensing said water treating agent independently of whether a control volume thereof is being or has been prepared, said water treating agent having a concentration of chemical agent sufficient for treating a substantially larger volume of untreated water therewith to render said larger volume potable.

In particular, the device may be configured for disinfecting water to provide disinfected water.

The control system may be configured for carrying out a plurality of said preparation cycles in a consecutive manner, wherein a next preparation cycle is activated when a said control volume of water prepared by a previous preparation cycle has been essentially dispensed. The dispensing outlet may be connectable to a water distribution network.

The vessel may comprise a main chamber for dispensing therefrom water treating agent via said dispensing outlet, and wherein said treatment sub-system comprises a receiving chamber for receiving the dose of chemical agent during the or each preparation cycle, said receiving chamber being in fluid communication with said main chamber. The treatment sub-system may comprise a mixing arrangement in fluid communication with said receiving chamber configured for at least one of dispersing and dissolving the dose of the chemical agent with water during the or each preparation cycle, and a pump for pumping water treated by said mixing arrangement to said main chamber. The pump may comprise a powered pump in fluid communication with said main chamber and with an inlet port of an ejector arrangement, said receiving chamber being in fluid communication with a suction port of said ejector arrangement, an outlet port of said ejector arrangement being in fluid communication with said mixing arrangement. The mixing arrangement may comprise a cyclone configured for at least one of forced dissolution or dispersal of the dose of chemical agent in water.

The control system may comprise sensors for sensing a maximum level of water in said vessel corresponding to said maximum water volume, and for sensing a minimum level of water in said vessel corresponding to said minimum water volume.

The receiving chamber may be accommodated within said main chamber.

The vessel may be connectable to a supply of untreated water via an untreated water inlet port, said untreated water inlet port comprising a valve operatively connected to said control system.

The control system may comprise at least one of an electronic and a microprocessor control unit.

The device may further comprise a dispensing mechanism reversibly connectable to a suitable supply of said chemical agent, and configured for delivering a metered dose of chemical agent to said vessel responsive to said dispensing mechanism being activated via said control system. The dispensing mechanism may be configured for actively preventing dispensing of treatment agent therefrom in the absence of being so activated by said dispensing mechanism. The dispensing mechanism may comprise an auger for transporting treatment agent therethough and a dosing meter for selectively metering a predetermined dose of said treatment agent. The dispensing mechanism may comprise an outlet that may be coupled with said vessel at least during a said preparation cycle. The vessel may comprise a main chamber for dispensing therefrom treated water via said dispensing outlet, and wherein said treatment system comprises a receiving chamber for receiving the dose of treatment agent during the or each preparation cycle, said receiving chamber being in fluid communication with said main chamber, and wherein said outlet is coupled with said receiving chamber. The outlet may comprise a heating arrangement for selectively heating said outlet at least sufficiently such as to minimize ingress of moisture therethrough. The dispensing mechanism may comprise a hopper for channeling chemical agent to said vessel, and further comprises a knocker configured for selectively applying a knocking force to said hopper suitable for minimizing formation of bridging or the like.

The present invention also relates to a system for providing water, comprising:

a supply of water;

a device as defined herein; and a container configured for holding a supply of said chemical agent in substantially dry conditions, and configured for reversibly coupling to said dispensing mechanism;

wherein said device is operatively connected or otherwise coupled to said supply of water and to said supply of chemical agent.

The container may be configured for holding and providing said chemical agent in any one of: granular form, pellet form, particulate form, powder.

The container may be adapted for holding and providing a chemical agent in substantially dry form. The chemical agent may comprise a halogen generating agent. The halogen generating agent may be a free halogen generating agent, a chlorine generating agent, or a free chlorine generating agent, for example. The free chlorine generating agent may be chlorinated cyanurate selected from mono, di or trichloro isocyanurate. The chlorinated cyanurate may be selected from sodium dichloroisocyanurate (NaDCC), sodium dichloroisocyanurate dihydrate (NaDCC.2$H_2$O), potassium dichloroisocyanurate (KDCC), trichloroisocyanuric acid (TCCA), and mixtures thereof. The chlorinated cyanurate may be anhydrous or dihydrated NaDCC.

The container may further comprise a quantity of said chemical agent.

The control system may be configured for selectively altering the magnitude of the dose of said chemical agent provided to said vessel in the or each preparation cycle.

The present invention also relates to a method for providing disinfected or potable water, comprising:

providing a supply of chemical agent chosen from free chlorine generating agents and a supply of water;

preparing discrete and consecutive control volumes of water treating agent prepared from said supply of water and said chemical agent, and dispensing water treating agent thus prepared from said device to an untreated water source, a concentration of said chemical agent in said water treating agent being sufficient for enabling a predetermined volume of untreated water in the untreated water source to be treated, thereby to provide disinfected or potable water;

wherein a next control volume of said water treating agent after a previous control volume of said water treating agent has been dispensed thereby.

Optionally, the method may further comprise said water treating agent independently of whether a control volume thereof is being prepared or has been prepared.

The consecutive said control volumes of water treating agent may be prepared at a rate, and with an amount of said chemical agent in each prepared said control volume, that may be correlated to a magnitude of said predetermined volume and to a level of impurity of untreated water that it is desired to treat.

The magnitude of said control volume may be such as to enable said control volume to be dispensed in a dispensing time period that is generally less than a time period in which the said chemical agent decomposes in aqueous solution. For example, the chemical agent may be provided in a concentration so as to provide residual amount thereof in said potable water in the range of between about 0.1 ppm and about 5 ppm. The residual amount of the chemical agent may be between 0.5 ppm and about 3 ppm.

Step (a) may comprise providing water treating agent in discrete and consecutive control volumes thereof, wherein a next control volume of water treating agent is prepared after a previous control volume of water treating agent is consumed.

The chemical agent may be a halogen generating agent. The halogen generating agent may be a free halogen generating agent, a chlorine generating agent, and a free chlorine generating agent, for example. The free chlorine generating agent may be a compound of the general formula (I):

wherein
X, which may be the same or different within a single compound and represents a halogen or hydrogen;
W, which may be the same or different within a single compound, represents O;
and salts and tautomers of said formula.

The chemical agent may be halogenated cyanurate, which may be chlorinated cyanurates selected from mono-, di or trichloro isocyanurate. The chlorinated cyanurates may be selected from sodium dichloroisocyanurate (NaDCC), sodium dichloroisocyanurate dihydrate (NaDCC.2H$_2$O), potassium dichloroisocyanurate (KDCC), trichloroisocyanuric acid (TCCA) and mixtures thereof. The chlorinated cyanurate may be anhydrous or dihydrated NaDCC.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
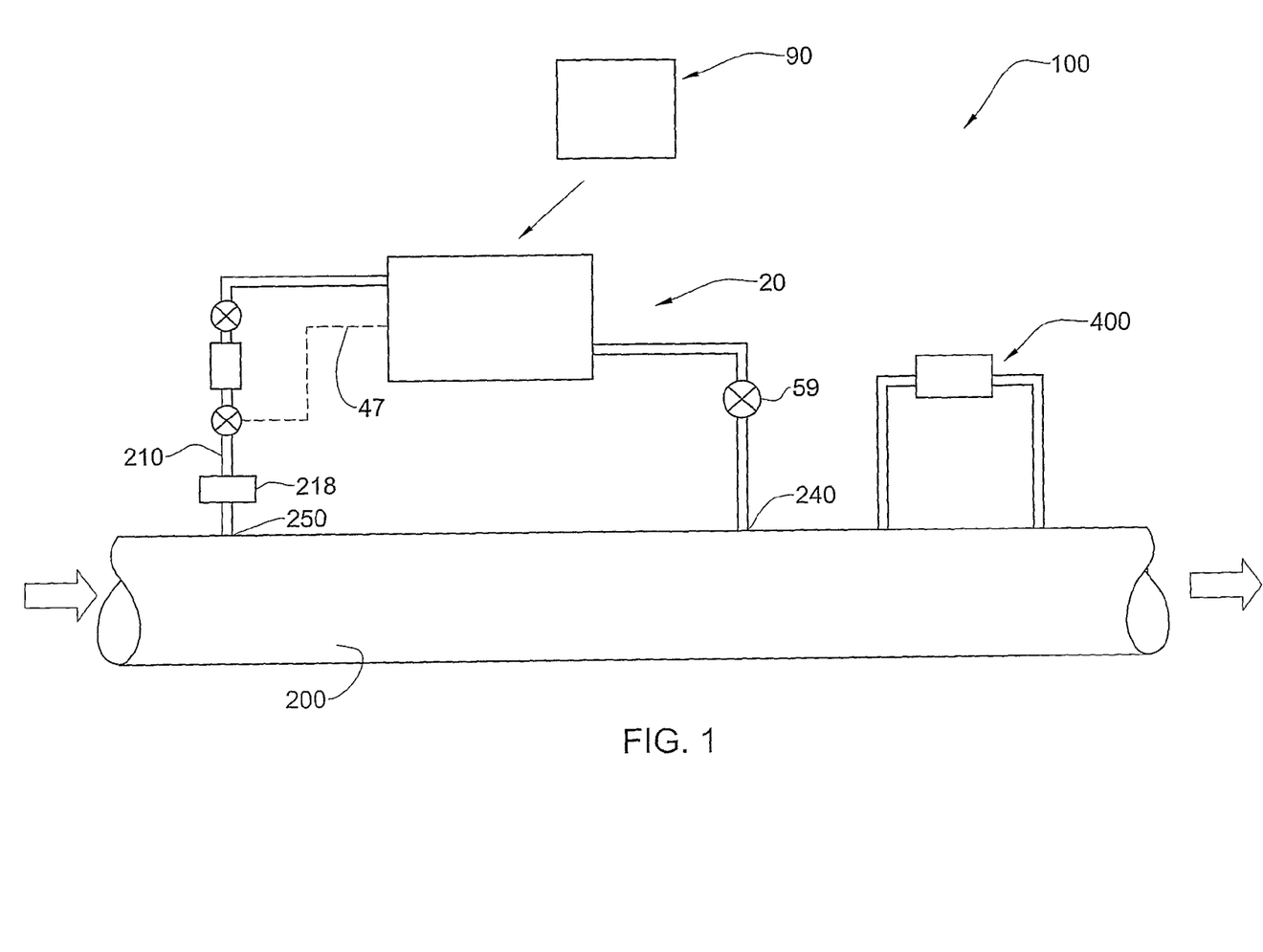
FIG. 1 schematically illustrates the main elements of an embodiment of a system according to one aspect of the invention.

According to one aspect of the invention, a system for the treatment of water, generally designated herein with the numeral 100 and illustrated in FIG. 1, comprises an apparatus or device 20 for preparing a water treating agent from a suitable chemical agent and water, and a container 90 for providing the chemical agent.

Figure 2:
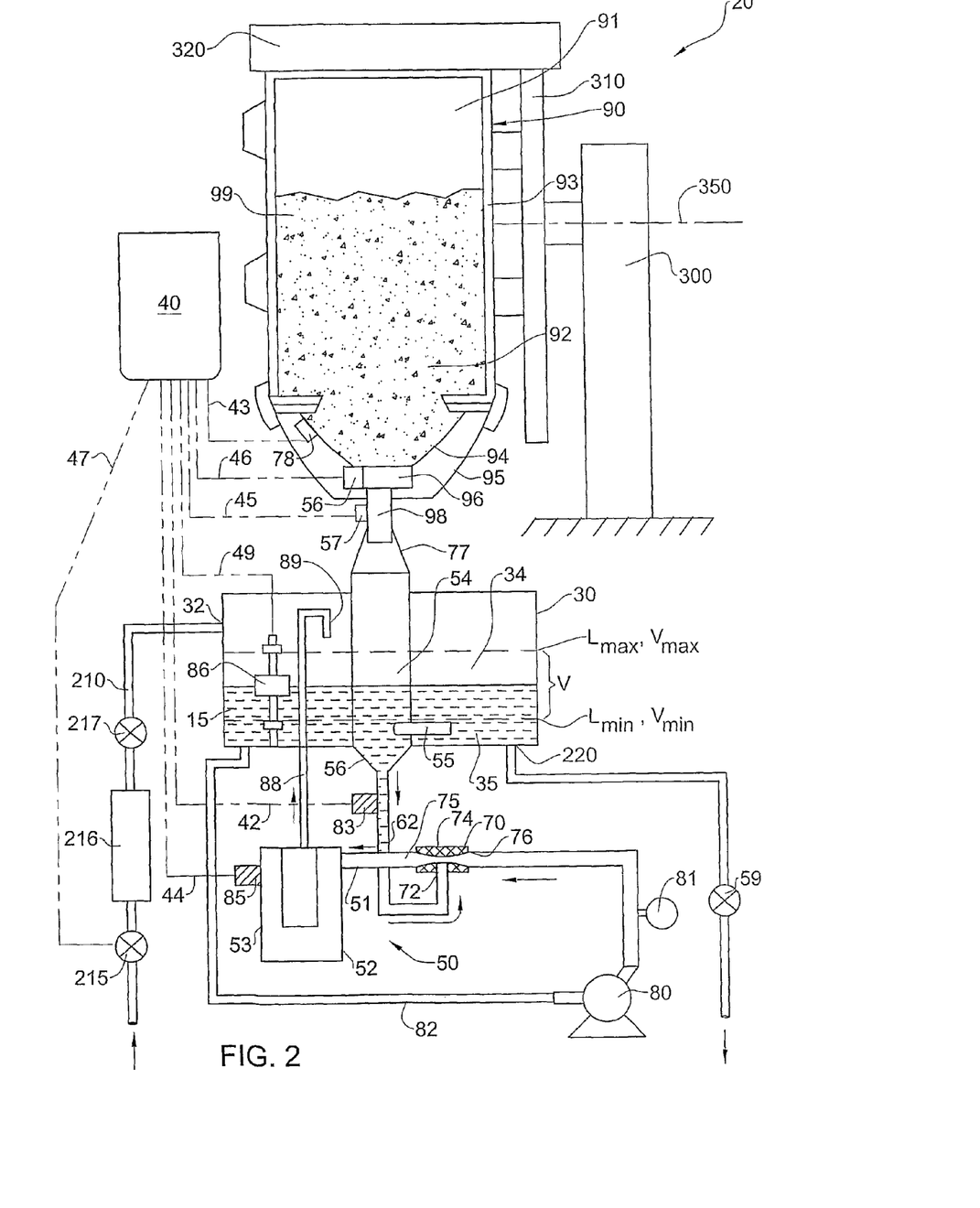
FIG. 2 schematically illustrates an embodiment of a device according to one aspect of the invention.

Referring in particular to FIG. 2, an embodiment of the device 20, which is per se novel, comprises a vessel 30 for containing and preparing a volume of water treating agent, and for dispensing the same for treating untreated water downstream of the system 100, and a control system 40 for controlling operation of the device 20 and system 100. According to one aspect of the invention, the water treating solution is a chlorine solution having a relatively high concentration, between a predetermined concentration range, to enable a much larger volume of untreated water to be treated or disinfected by the water treating solution when this is released into the aforesaid larger volume of untreated water.

Vessel 30 comprises at least one inlet port 32 that is connectable to an untreated water source 200 (see FIG. 1), via a conduit 210, and further comprises a main chamber 34 into which untreated water from said source 200 is selectively received when the device is in operation, in particular during a preparation cycle, as further discussed below. The untreated water source 200 may include, inter alia and by way of non-limiting example, one or a plurality of water tanks, bottles, containers and so on, one or more natural or man-made water reservoirs, water catchments, cisterns and so on, and so on. However, the invention finds particular application when applied to an untreated water source 200 in the form of a water mains of a water distribution network or the like, wherein a relative small proportion of the volume flow of untreated water flowing through the water mains is diverted to the system 100 to provide a water treating solution, which is then dispensed to the water mains to treat water in the mains, as the treating solution, together with the main water flow, continues to flow through the mains. According to one aspect of the invention, the untreated water source 200 comprises a water source capable of supplying water that may be potable after treatment with the water treating agent, and thus may include sources of fresh water that require purification and/or disinfection.

The inlet port 32 or conduit 210 may comprise any suitable connection arrangement, for permanent or reversible connection to the source 200, and a great variety of such connection arrangements are well known in the art. Conduit 210 comprises a valve 215, for example operated by an on/off solenoid switch, that may be controlled by the control system 40 via line 47, and thus the ingress of water into the vessel 30 can be selectively allowed or stopped. A flowmeter 216 may be provided for indicating the flow rate of untreated water into the vessel 30, and a variable valve 217, for example a needle valve, may be employed to control the untreated water flow rate ingress, i.e., the rate of volume flow of untreated water from source 200 entering the vessel 30. The variable valve 217 may be manually operated or automatically controlled, for example by means of the control system 40.

Where particulate matter, including sediments is known or suspected to exist in the untreated water source 200 or in conduits connecting the same to inlet 32, a suitable filter or series of filters 218, settling chambers, or indeed any other suitable separation technology may be employed upstream of the device 20 for separating and removing such sediments from the untreated water prior to processing by said system 100.

The vessel 30, and in particular chamber 34, may have any suitable form and size, typically consistent with the particular application of the device 20 and system 100. In the illustrated embodiment, the system 100 may be applied for use with respect to a water mains that delivers the treated water to a plurality of points of use. Alternatively, the system 100 may be applied for use with a distribution water tank, such as for example a water tower that delivers drinking water to a drinking water point of use system, for example to a plurality of homes, offices, schools, and so on. Alternatively, the system 100 may be applied for use in an industrial plant for the disinfection of industrial water, e.g. cooling towers. In each case, the system 100 provides water treating agent in discrete volumes or batches, i.e., in a series of control volumes thereof, each being substantially less than about 10 liters, for example. The invention, the system 100 may be of a relatively compact construction, optionally accommodated in a suitable housing (not shown), and may be relatively easily transported and installed with respect to a water mains, distribution water tank, and so on. Alternatively, the vessel 30 may have a much larger capacity, for example preparing a series of water treating volumes, each greater than 10 liters, according to the demand, for example the volume flow rate of the untreated water, and such an embodiment of the system 100 can be used as a substantially permanent, typically external, static structure.

The vessel 30, and any parts of the system that come into contact with the water treating agent according to the invention may be made from materials such as plastics, for example polypropylene, PVC, HDPE or the like, and/or some suitable metals or alloys, for example that are not corroded or otherwise adversely affected by the water treating agent or lined with a plastic material.

In other applications, the system 100 may be used as a mobile water treating/purification system, carried on a mobile platform such as a truck, for example, and used as an emergency or temporary measure for providing water treating agent to a water mains where it has been determined that a leak or other factor has caused contamination of previously treated water. Once the source of contamination is dealt with, the system 100 can be disconnected from the mains, and then moved to another location where needed.

In any case, at least the inside surface 35 of the chamber 34 is made from, or at least coated with, an impermeable and substantially inert material with respect to water and/or to the water treating agent that is used therewith.

The vessel 30 further comprises a water treating agent preparation sub-system 50, for converting the volume of water 15 contained in the vessel into a water treating agent, using an amount of a chemical agent 99 such as a chemical, disinfecting agent, which is provided by the container 90 via dispensing mechanism 96. The sub-system 50 is thus adapted for mixing, in particular dissolving and/or dispersing the chemical agent 99 in a body of water contained by the vessel 30, depending on the nature of the water treating agent, which is originally in dry, solid flowable form. In the embodiment illustrated in FIG. 2, the sub-system 50 is particularly configured to dissolve/disperse or otherwise mix the chemical agent 99 in an efficient, quick and substantially homogenous manner, and thus comprises a preparation arrangement in the form of a mixing chamber or cyclone 52. In operation, the cyclone 52 induces a rapid vortex flow to the dissolved/dispersed water treating agent, aiding in the dissolution and/or dispersal of the agent therein to produce water treating solution. The cyclone 52 comprises a cylindrical chamber 53 having a tangential inlet 51 thereinto, whereby the dissolved/dispersed chemical agent is fed into the chamber 53 to swirl along its cylindrical walls. The vortex thus formed retains undissolved solids at the periphery of the cylindrical chamber 53, avoiding their immediate escape back to the dispensing/storage vessel 30. In this way particulate matter of agent 99 are constrained within the cyclone 52 to dissolve. The dissolution may be very fast—typically in the order of several seconds—so that the treated water returning to the dispensing/storage vessel 30, which may be free flowing thereto from the cyclone 53, is substantially clear. Alternatively, the cyclone 52 may be replaced with a powered mixer arrangement that serves to swirl the water/chemical agent mixture by means of an impeller or the like, for example, or indeed any suitable dissolving vessel provided with an effective stirrer or other arrangement that provides intimate mixing of the solid agent 99 with the untreated water or aqueous solution of agent 99 and water. Optionally, a suitable heater (not shown) may be provided for heating the water in the device 20, which may facilitate dissolution of the chemical agent 99 when ambient temperatures are low.

The presence of water treating agent 99 in granulate form (particulate matter) in the cyclone 52 can be used for supervising the agent dosing in the treated water. A suitable detector 85, for example, a suitable optical detector monitors presence of such granulated agent 99, and is operatively coupled to control system 40 via line 44. The control system 40 may be configured to stop operation of the system 100, or at least to generate an audio/visual alarm, for example flashing lights and/or a bell, if no granules are detected within a particular time, which is interpreted as faulty dosing of the granulated agent 99 from the container 90.

The sub-system 50 further comprises a receiving chamber 54, in this embodiment accommodated within the main chamber 34, and sized to receive an appropriate amount of chemical agent 99 from the container 90 when the system 100 is in operation, during a preparation cycle, or during a priming cycle, as will be described in greater detail herein. The receiving chamber 54 is in open communication via opening or conduit 55 with the main chamber 34, and may further comprise a funnel shaped bottom end 56 for channeling the contents of the chamber 54, typically in slurry form at the beginning of a preparation cycle, via conduit 62, to a suction port 72 of a venturi or ejector 70 (i.e., at or near the throat thereof, having an ejector inlet port 76 and ejector outlet 74), and thence, via the ejector outlet 74 and conduit 75, to the cyclone 52. A powered pump 80, for example, a centrifugal booster pump, in fluid communication with the main chamber 34 via conduit 82, recycles water treating solution through the device 20. As slurry is sucked from the receiving chamber 54 via ejector 70, liquid contents (untreated water together with water treating solution) are drawn into the receiving chamber 54 via conduit 55, which is preferably tangentially arranged with respect to an inner cylindrical wall of receiving chamber 54, inducing a swirl vortex flow therein and facilitating mixing of the agent 99 with the liquid contents therein. The pump 80 pumps water from the main chamber 34 to the inlet port 76 of the ejector 70, and in so doing provides a suction force at the suction port 72 of the ejector arrangement 70, sucking the contents of the receiving chamber 54 therethrough. A pressure gauge 81 monitors the pump pressure. Thus, the ejector 70 and pump 80 act as a pumping system for pumping dissolved/dispersed chemical agent from the vessel 30 into the cyclone 52, and thus it is also possible to replace the ejector arrangement 70 and pump 80 with a single pump that is capable of transporting dissolved/dispersed water treating agent from the vessel 30 into the cyclone 52. Operation of the ejector 70 and pump 80 are controlled by the control system 40, operatively connected thereto. Faulty pump performance, resulting in lower suction performance by the ejector 70, can be monitored via flow switch 83, operatively coupled to control system 40 via line 42.

The treatment sub-system 50 further comprises an outlet conduit 88 for channeling the essentially dissolved/dispersed/mixed water treating agent, in particular, a solution of water treating agent, to the main chamber 34. In the illustrated embodiment of FIG. 2, reintroduction of the water treating agent into the main chamber 34 is via an outlet 89 arranged above the chamber 34, and serves to facilitate further mixing of the water treating solution with the other water in the chamber 34, which may comprise previously prepared water treating solution and also a contribution of untreated water from inlet 32, depending on the particular point within the preparation cycle. However, this arrangement is not essential, and the outlet 89 may be directly coupled to a side wall of the chamber 34 so as to discharge water treating solution at any desired point into the chamber 34.

During normal operation of the system 100, the level of water treating solution in the vessel 30 generally fluctuates between a maximum volume $V_{max}$, typically the design maximum fluid capacity for the vessel, and represented by a maximum water level $L_{max}$, and a minimum volume $V_{min}$, typically the residual volume of the vessel, and represented by a minimum water level $L_{min}$, with respect to the vessel. Suitable sensor(s) 86, operatively coupled with the control system 40 via line 49, monitor the level within the main chamber 34, in particular, when the level of water treating solution reaches either one of these levels. Sensors 86 may comprise, for example a floating switch that translates along a vertical stem as the water level changes, which interact with suitable electro-mechanical elements in the stem when the switch alternately reaches $L_{max}$ or $L_{min}$, and transmit an appropriate signal to the control system 40 via line 49.

The volumetric difference between $V_{max}$ and $V_{min}$ is referred to herein as a control volume V of the device 20. In each regular preparation cycle according to the invention, sufficient untreated water from source 200 and a predetermined dose of chemical agent 99 from the container 90 are introduced into the device 20 such as to prepare a control volume V of water treating agent.

By way of non-limiting example, a system 100, may be configured to have a control volume V of about 5 to about 6 liters, or up to about 10 liters, though in other embodiments it may be about 0.5 liter, 1.0 liter, 1.5 liter or 2.0 liter, for example, and the residual volume $V_{min}$ is a fixed volume of between about 2 to about 4 or to about 6 liters, depending on requirements, for example. In yet other embodiments, the control volume V may be greater than about 10 liters.

The control system 40 may comprise an electronic or microprocessor-based control system, using electrical signals from various sensors in the system 100 as input to operate, activate and control other parts of the system 100, such as valves, pumps and so on. However, at least some parts of the control system 40 may be based on mechanical parts that automatically open or close water valves, and thus control water ingress into and out of the system, in a mechanical manner according to preset conditions.

In particular, the control system 40 is configured for controlling a number of activities, including the following:

(a) Initiating and controlling the carrying out of at least one preparation cycle for providing at least a dispensable control volume V of water treating agent in said vessel 30, responsive to a volume of water treating solution in vessel 30 being not greater than the minimum water volume $V_{min}$, i.e., once the volume of water in the vessel 30 is substantially equal to or less than $V_{min}$, indicated by minimum level $L_{min}$. Thus, when the water level reaches $L_{min}$, a new preparation cycle is initiated, and in each new preparation cycle the control system 40 is configured to allow ingress of untreated water and of a controlled dose of the chemical agent 99 into the vessel and for activating the sub-system 50, such as to provide a control volume V of water treating agent.

(b) Preventing ingress of untreated water to the vessel 30 responsive to at least one of the following conditions being present:
   (i) the volume of water in the vessel 30 being not less than a maximum water volume, i.e., once the volume of water in the vessel 30 is substantially equal to or greater than $V_{max}$, indicated by maximum level $L_{max}$ water input into the vessel 30 is stopped; and
   (ii) a preparation cycle being terminated, i.e., untreated water is only added during a preparation cycle, when the system is in "preparation mode", as disclosed further hereinbelow.

In other words, the control system, during normal preparation and dispensing operation, and thus excluding the priming and purging cycles, allows untreated water ingress (and dry chemical agent ingress) only during a preparation cycle, and in such a case only until a maximum volume of solution is reached, indicated via the maximum level $L_{max}$.

In any case, the control system 40 is configured in a manner such that ingress of untreated water into the vessel 30 is allowed while the vessel is filling from $L_{min}$ to $L_{max}$, and for preventing ingress of untreated water into the vessel while the vessel is emptying from $L_{max}$ to $L_{min}$. In a similar manner, the control system 40 is also configured in a manner such that ingress of dry chemical agent into the vessel 30 is allowed while the vessel is filling from $L_{min}$ to $L_{max}$, or in some cases before filling with untreated water commences or when filling is complete, and for preventing ingress of chemical agent into the vessel while the vessel is emptying from $L_{max}$ to $L_{min}$. Optionally, a number of mechanically controllable valves may be used, as part of the control system 40, for carrying out at least part of (a) and/or (b) above. Further optionally, one or more of the actual levels $L_{max}$ and $L_{min}$ may be variable, and thus allow the size of the control volume V to be selectively changed. This may be a useful feature, for example, when demand of water treating solution from the system 100 has a large range, and on the one hand it is desired to prepare only small batches of water treating solution when the demand is low, but to provide large batches quickly when the demand is high. In such an option, the dosing device 66 takes into account any such change in the control volume when controlling dispensing of the agent 99 into the device 20. Alternatively, the rate at which the control volumes V, of water treating solution are prepared and dispensed to the water mains may also be increased or decreased to match demand, by controlling the water flow rate into the device 20 via valve 217, and matching the rate of supply of agent 99 thereto to provide, for each control volume, the desired concentration of water treating solution.

The control system 40 may be further configured to monitor the correct working of the inlet valve 215, for example by timing the filling time of the vessel 30. Thus, if the sensors 86 do not advise that the upper level $L_{max}$ has been reached within the expected time period after filling has commenced, the control system 40 may provide a suitable alarm to alert that there may be something wrong with the valve 215, or indeed with valve 217 or flowmeter 216 or with the supply of untreated water itself. Alternatively, the control system 40 may store in a suitable memory the start time and the stop time for the valve 215 during a particular preparation cycle, calculate the time difference, and then compare this time difference with the corresponding elapsed filling time obtained in the previous preparation cycle. A particular percentage increase in the filling time may indicate faulty functioning as in the previous example, and control system 40 may then prompt the user, for example by means of a prearranged alarm, to investigate the matter and to correct the same.

The device 20 further comprises a dispensing outlet 220 for dispensing water treating agent to a dispensing pump 59, and thence to a fresh water line or a basin, which may be a downstream portion of the water source 200 so as to enable the water treating agent to flow along with untreated water thereof and treat a portion thereof, providing disinfected or potable water, to be available for consumption. Alternatively, the outlet 220 may be connected to a different water distribution system, so that the water treating agent serves to treat water in that system.

Thus, as a variation of the above embodiment, a source of fresh water, such as for example a tank of fresh water, may be provided and connected to inlet 32 via valves 215, 217, and optionally flowmeter 216, so that the system 100 is provided with water from this water source in order to provide water treating solution therefrom, rather than obtaining untreated water from the source 200 for this purpose. In such a case, it is only necessary to provide one connection point, i.e., an entry point 240 into source 200, rather than two connection points (inlet point 240 and outlet point 250).

In normal operation of the system 100, water treating agent may be dispensed continuously from the system 100 to the source 200, irrespective of whether the system has finished or is executing a preparation cycle, as the residual volume $V_{min}$ provides water treating solution, even at the beginning of a preparation cycle when the level of liquid contents in the vessel 30 is at $L_{min}$. In such a scenario, though, it is contemplated that the dispensing flow rate will be less than the rate at which a new control volume of water treating solution is being prepared.

Optionally, it may be desired to interrupt the dispensing of water preparation agent when the level of the liquid contents reach $L_{min}$, or indeed as a safety measure when the level falls further to a design minimum, to prevent having to prime the system if this runs dry (for example as a result of the dispensing rate to the source 200 was set too high. For use in a case, the dispensing outlet 220 may be positioned at the minimum level $L_{min}$, or at the lower design minimum level, and this ensures that in normal operation of the system 100, no water treating agent is dispensed after the minimum water level or design minimum level is reached. In such a case, the device 20 may further comprise a drain (not shown) for purging the same of water during a purge cycle (see below). In such a case, the configuration of the vessel 30 in having such an arrangement for the dispensing outlet 220 may be considered as part of the control system 40, which is thus configured for initiating a preparation cycle when the water level reaches the dispensing outlet 220. For example, a flow sensor or other sensor may be provided at the dispensing outlet which indicates to the control system that the liquid contents have reached the minimum level when the flow therethrough stops.

The container 90 is configured for storing and dispensing metered doses of dry chemical agent 99 to the receiving chamber 54 of the device 20, via dispensing unit 95, during an operation mode of the system 100 referred to herein as the preparation cycle. The container 90 in this embodiment is replaceable, and is removably connected to a dry agent dispensing unit 95 that forms part of the device 20. The container 90 comprises a tank chamber 91 defining a holding volume between peripheral walls 93, and an opening 92, for providing therefrom the anhydrous chemical agent 99 in the form of flowable dry solid, which form will be described in greater detail herein, and for providing the dry agent to the dispensing unit 95.

The dispensing unit 95 is configured for reversibly coupling with the container 90, for receiving dry agent 99 from the container 90 via hopper 94, and for dispensing the same into the vessel 30 selectively and at a volume flow rate as determined by the control system 40.

A knocker 78 is provided in at least one of the converging walls of hopper 94, and during operation thereof provides a fluctuating force on the wall(s) of the hopper 94, knocking or shaking the same, and thus preventing possible bridging and/or rat-holes of the solid contents of the tank chamber 91, as otherwise sometimes may happen in such tanks. The knocker 78 may comprise, for example, a motor turning a cam or operating a piston against the corresponding wall of the hopper 94, such that, as the motor turns, the relative distance between the wall and the motor fluctuates. The knocker 78 is operatively connected to the control system 40, as indicated by broken line 43, and the control system 40 may operate the knocker 78 according to any desired or predetermined schedule, for example at periodic intervals.

The dispensing unit 95 further comprises a dispensing mechanism 96 for dispensing or otherwise delivering a metered dose of said agent 99 to the device 20 during a said preparation cycle. The dispensing mechanism 96 comprises in this embodiment a dosing screw feed or auger (not shown), mounted for turning within a coaxial cylindrical chamber at the bottom end of the hopper 94, by means of a motor (not shown), and for transporting the agent 99 to an outlet 98. The rate of rotation, and duration of rotation (correlated to the start and stop times) of the auger, coupled to the radial width and to the pitch of the augur blades, may be used to determine the amount of solid agent 99 actually transported therefrom to the outlet 98, and is controlled by dosing device 66. The dosing device 66 is in turn activated and controlled by the control system 40, operatively connected thereto, as indicated by broken line 46. The outlet 98, which may optionally be in the form of a nozzle, may optionally be heated, for example via an electrical heating element 57, to minimize or prevent moisture from penetrating therethrough and into the tank chamber 91. This feature may be of particular importance when operating the system 100 in high humidity environments. The heating element 57 may be selectively activated and controlled by the control system 40, operatively connected thereto, as indicated by broken line 45. A humidity sensor (not shown) may be employed for detecting the level of humidity in the vicinity of the outlet 98 and provide suitable humidity data to the control system 40 to aid in its control and operation of the heating element 57.

Faulty functioning of the dispensing mechanism 96 can be detected, for example, by sensing a reduction of agent 99, in granulate form, in the cyclone 52.

By way of non-limiting example, the container 90 may be a standard container, for example a 50 Kg drum, in which the agent 99 is provided from the manufacturer thereof, and is designed to reversibly couple with the dispensing unit 95. When a fresh supply of agent 99 is required, the old container 90 is removed, and a new container is coupled to the dispensing unit 95. A stand 300 is provided, anchored to the ground or to a suitable structure, and having a container holder 310 pivotably mounted on the stand 300 for rotation with respect thereto about a horizontal axis 350. The container holder 310 comprises a base 320 radially displaced from the axis 350, and the container is mounted onto the holder, held firmly therein by clamps, straps, or the like, and such that the closed end of the container is on the base 320 with the tank opening 92 facing upwards. The dispensing unit 95 is then coupled to the container 90, and clamped securely thereto, to provide open communication between the hopper 94 and the opening 92, and the holder 310 is then rotated by 180° so that the dispensing nozzle 98 is facing the receiving chamber 54, assuming the position illustrated in FIG. 2.

Alternatively, the container 90 may be permanently coupled to the dispensing unit 95, and comprises a suitable opening, for example at a longitudinally end thereof opposed to the dispensing unit 95, via which the tank may be refilled when needed. Such a container may be configured to hold a standard amount of agent 99, for example, correlated to standard packs of the agent 99. Thus, for example, the container 90 may be sequentially filled from packages of any size containing between, 1 and about 500 Kg, for example, of agent 99, as needed. Smaller standard packages of agent 99 are generally more easily handled for home-environment type systems 100, while larger standard packages are generally more suitable for larger capacity systems 100.

In the illustrated embodiment of FIG. 2, the outlet 98 is in overlying vertical relationship with respect to the receiving chamber 54, so that when the dispensing mechanism 96 is activated, agent 99 falls directly (under gravity) into the receiving chamber 54. A cover 77 may be provided between the upper open end of the receiving chamber 54 and the outlet 98. Alternatively, though, the dispensing mechanism 96 may be coupled to the vessel 30 in many other different ways. For example, the container outlet 98 may be gravitationally aligned with respect to the receiving chamber 54 either directly (vertically) or via a sloping slide, gutter, ramp and so on, enabling the container 90 to be horizontally offset with respect to the device 20.

Optionally, the container 90 and/or the dispensing unit 95 further comprises a suitable sensor (not shown), operatively connected to the control system 40, for detecting the presence of solid agent 99 in the holding volume above a particular minimum level. For example, a suitable sensor, for example a capacitive sensor, may be provided that generates a suitable signal once the level of solids drops below this level, so that the user may be provided with a prompt for refilling or replacing the container 90.

In other embodiments of the system 100 according to the invention, rather than a container 90 and dispensing unit 95, any suitable solid agent delivery system may be provided that comprises a receptacle for holding therein water treating agent in substantially dry conditions, and that is further configured for delivering a metered dose of said agent 99 responsive to being activated for doing so by the control system 40 during a said preparation cycle. For example, a conveyor system having an end thereof in overlying relationship with the receiving chamber 54 may be used for selectively transporting discrete quantities of agent 99, suitably arranged on the conveyor belt. In another example, discrete sized pellets or packs of said agent can be selectively dropped into the receiving chamber 54 from a dispenser comprising a stack of pellets and a trapdoor arrangement configured for dispensing a single pellet at a time. Other arrangements for delivering metered doses of dry agent 99 are possible.

Optionally, the control system 40 may be configured for transmitting suitable signals to a servicing center (not shown), for example via an internet connection or the like, to alert regarding faulty operation of the system 100, and thereby requesting emergency servicing. This is particularly useful when the system 100 is being utilized automatically in remote areas without regular human intervention.

In a variation of this embodiment, the receiving chamber 54 may be located externally with respect to said main chamber 34, but is otherwise substantially identical, mutatis mutandis, to the embodiment of FIG. 2. A feature of this variation is that it facilitates cleaning, servicing or replacement of the main chamber 34, though in a relatively less compact construction than that of the embodiment of FIG. 2.

Optionally, the device 20 may further comprise an additional sensor for sensing whether the level of liquid contents has exceeded the upper limit $L_{max}$, for example due to malfunctioning of some parts of the device 20, and may further comprise suitable means for shutting off any further ingress of water into the vessel 30 until the problem is solved. For example, a shut-off valve mechanically coupled to a float can be configured for shutting off the flow from inlet 32 when the water level reaches a particular point. Alternatively, an overflow outlet may be provided at this upper level to bleed off water so that the liquid level does not reach the dispensing mechanism and risk wetting the contents of the container. A suitable alarm may optionally be linked to these features for alerting users that an overfilling situation is in progress, and that remedial action may be required.

According to another aspect of the invention, a treatment device 20, which is per se novel, is provided for use in system 100, substantially as described herein, mutatis mutandis.

According to one aspect of the present invention, the said chemical agent 99 is a water purifying agent or water disinfecting agent, preferably in a particulate form. According to one embodiment, the water purifying/disinfecting agent is a halogen generating agent, preferably, a free chlorine generating agent. Halogen generating agents are known in the art, typically for disinfecting circulating water, such as in swimming pools, wading pools, water-parks, fountains, hot tubs, and spas.

In the context of the present invention the term "particulate form" refers to any form of minute separate particles comprising the chemical agent, which allows for the slow dissolution in the treated water and thus slow release of halogen into the treated water. Halogen, in the context of the invention includes bromine, iodine, however, preferably, chlorine. The particulate form may be any finely divided form selected from, powder, tablet, granular substance, flake, pellet and the like provided that it is free flowing. The size of the particle may vary depending on its form and the average size thereof may range between 150 micron and 5000 micron in diameter. Pellet is a preferred form of the disinfecting agent in accordance with the invention, the pellet having an average diameter within the range of 1000 and 3000 micron According to a preferred embodiment, the chemical agent is a dry particulate matter. The term "dry particulate form" or "dry particulate matter" denotes a form essentially free from water under normal ambient conditions. Essentially free from water denotes an anhydrous compound or a compound hydrated with about less than 0.1% moisture.

It is noted that halogen generating agents in dry form have a long shelf-life and can thus be preserved in solid state for very long time, contrary to corresponding concentrated solutions. Thus, the present invention is especially advantageous for treating potable water in remote, rural areas with irregular supply periods. According to one embodiment, the halogen generating agent has a shelf life of at least one year, preferably of 5 years.

According to one embodiment, the chemical agent is a compound of the general formula (I):

wherein

X, which may be the same or different within a single compound and represents a halogen or hydrogen;

W, which may be the same or different within a single compound, represents O;

and salts and tautomers of said formula.

According to one preferred embodiment of the agent 99, the halogen is selected from bromo, iodo, chloro;

According to another embodiment, W represents oxygen.

According to yet another embodiment, W represents oxygen and X represents the same halogen.

According to a preferred embodiment, W represents oxygen and X represents the same halogen, the halogen being preferably chloro.

In accordance with one embodiment, the chemical agent is a salt wherein the counter ion may be selected from sodium, potassium, calcium, and magnesium, preferably being sodium and potassium.

The salt form of the compound of formula (I) may be presented by the following general formula (Ia):

wherein

W and X are as defined above and M is a suitable counter ion. Examples include, without being limited thereto, sodium, potassium, calcium, and magnesium, preferably sodium and potassium.

Preferred counter ions are of the alkali metal series, such as, without being limited thereto, sodium, potassium and lithium as well as other alkali and alkali earth metal ions.

When W are all oxygen, the compound of formula (I) and (Ia) are commonly known by the term cyanuric acid or cyanurate, respectively.

According to one embodiment, the chemical agent is halogenated cyanurate. According to one preferred embodiment, the chemical agent is chlorinated isocyanurate, including mono, di or trichloro isocyanurate, with dichloro isocynurate (DCC) being a preferred compound.

Typical chlorinated cyanurates are sodium dichloroisocyanurate (NaDCC), sodium dichloroisocyanurate dihydrate (NaDCC.2H$_2$O), potassium dichloroisocyanurate (KDCC), trichloroisocyanuric acid (TCCA), and mixed complex of potassium dichloroisocyanurate and trichloroisocyanuric acid (e.g. 4 KDCC to 1 TCCA).

Chlorinated isocyanurates hydrolyze with use in water to form isocyanuric acid (cyanuric acid) and free available chlorine, as hypochlorous acid (HOCl), the "killing form" of chlorine.

Chlorinated derivatives of isocyanuric acid are commercially available. Dichloroisocyanuric acid and trichloroisocyanuric acid and alkali metal salts of dichloroisocyanuric acid (NaDCC) are known as a source of active chlorine. They are used to treat water supplies to prevent the growth of pathogenic bacteria and are used in detergent, bleaching, and sanitizing compositions.

NaDCC and trichloroisocyanuric acid are produced commercially by the chlorination of the corresponding sodium salt of cyanuric acid. Of these two agents, sodium dichloroisocyanurate is preferred in accordance with the invention since it is highly water soluble and therefore rather more versatile than the essentially sparingly water soluble trichloroisocyanuric acid. NaDCC its dihydrate and trichloroisocyanuric acid are high-purity, white crystalline solids, available in a variety of mesh sizes. Although highly reactive oxidizers, the dihydrated NaDCC can be handled and transported with relative ease and safety.

It is noted that in accordance with the invention, mixtures of two or more chemical agents may also be used. The chemical agent, or mixtures thereof, is preferably readily soluble in water. The feature of being readily soluble in water may be defined as the dissolution (at 25° C.) of between about 1% to an about 40%, preferably between 10% to 30% solute per kilogram solvent. For example, NaDCC has solubility in water of up to about 24% at 25° C. Alternatively, the solubility the chemical agent may be defined as the dissolution of between 5 and 25 grams of the chemical agent in 100 grams water.

The chemical agent 99 in accordance with this embodiment of the invention preferably lacks odor or taste when used in water according to the allowed levels of residual available chlorine.

The resulting solution is preferably a clear solution, without deposits, and may be dispensed directly into the water storage tank.

The system 100 according to the invention may be operated as follows.

Preparation Cycle

A preparation cycle may be carried out after the device 20 has been primed, and for this purpose a suitable amount of water and optionally chemical agent 99 may be provided to reach the minimum level $L_{min}$. In each preparation cycle according to the invention, a control volume V of water treating solution is prepared in batch form, for dispensing to the source 200 via dispensing pump 59. During such dispensing, and until the control volume V is essentially fully dispensed from the vessel 30, no additional untreated water is allowed into the device 20, and the control system 40 ensures the same by maintaining closed valve 215. Similarly, no further chemical agent is provided between the end of a preparation cycle and the beginning of another preparation cycle.

A preparation cycle can in general be initiated either after initial priming of the device 20, or whenever the level of solution in the vessel reaches $L_{min}$, whereupon the control system 40 activates the dosing device 66 to dispense a predetermined quantity of agent 99 in particulate form from the container 90 into the receiving chamber 54, and this is concurrently accompanied by an ingress of untreated water via inlet 32 (typically from the source 200) until the maximum water level $L_{max}$ is reached. The dosing device 66 may directly control the amount of agent 99 provided by suitable means directed at providing a particular (but selectively variable) volume of the agent. Alternatively, the dosing device 66 may control the amount of agent 99 indirectly, wherein fixed and discrete volumes of agent are selectively supplied at controllable time intervals, and controlling the number of consecutive discrete doses and/or time intervals within a predetermined elapsed time period.

In other embodiments of the invention, the dispensing of dry agent nay be followed, or alternatively preceded by the ingress of untreated water. At this point the water ingress is cut off: sensors 86 provide level information to the control system 40 which then activates the valve 215 to a closed position, and it remains closed until the next preparation cycle, i.e., until the level of the liquid contents in the vessel 30 once again reaches $L_{min}$.

According to the desired concentration threshold of agent 99 in the water treating agent that is being prepared, the dose of agent 99 will be appropriately metered via dosing device 66, and this threshold may be selectively changed by the user via a suitable interface with the control system 40. The agent 99 may be provided in a continuous manner, or in an intermittent manner, for example allowing agent 99 to be provided for time periods, of say about 12 seconds each by way of non-limiting example, intercalated by other time periods, of say about 48 seconds each by way of non-limiting example, wherein no agent 99 is provided. Intermittent dispensing of agent 99 can improve the mixing efficiency of the agent 99 in the water.

During (though in some variations of this mode of operation, after) the agent dispensing step described above, the slush mixture of agent 99 and water treating solution in the receiving chamber 54 is sucked through conduit 62 under the action of ejector 70 and pump 80, which also channels additional water from the main chamber 32 via conduit 82 to the ejector 70. The fluid contents exiting the ejector 70 are then thoroughly mixed, with the agent 99 dissolving and/or dispersing substantially homogeneously in the water by means of the cyclone 52, and the resultant water treating agent is re-channeled to the main chamber 32 via port 89. As the contents of the receiving chamber 54 are sucked via conduit 62, water in the main chamber 32 enters the receiving chamber 54 via tangential opening provided by conduit 55, swirling the contents of the receiving chamber 54. Thus, a recirculation system is set up in the device 20, ensuring more and more thorough and uniform mixing of the chemical agent in the full volume $V_{max}$. However, as the vessel 30 is being filled from inlet 32, the actual concentration of the solution of the chemical agent 99 therein may vary, though after the full amount of agent 99 and water is provided, the concentration may be substantially uniform, and this is facilitated by means of the recirculation provided by the pump 84.

The amount of chemical agent 99 dispensed into the receiving chamber 54 will generally depend on the type of agent used and the desired concentration of the water treating agent that it is wished to dispense from the vessel 30. The amount of the agent 99, when this is halogen generating agent dispensed into the receiving chamber 54, is such which provides for residual halogen in the source 200 downstream of the connection point 240 for a given volume flow therethrough, for example. The concentration of the agent in the water treating solution is preferably within the range of between about 5% to about 20%, preferably about ca. 10%, particularly when the agent 99 is fully mixed/dissolved/dispersed within the volume of water in the vessel 30. The residual amount of the agent in source 200 may be within the range from about 0.1 ppm to about 5 ppm, preferably between about 0.5 ppm and about 3 ppm.

When the vessel 30 is full, i.e., has been filled until reaching the upper level $L_{max}$, the agent feed via dispensing unit 95 and the untreated water feed via valve 215 are halted automatically, but the pump 80 continues to work for a while longer, for example for another minute or so, to ensure a full dissolution and homogenization of the full volume $V_{max}$ of water treating agent in the vessel 30.

Optionally, a first preparation cycle may be performed together with the initial priming of the system 100.

Dispensing Operation of System

Dispensing of water treating solution into the source 200 at connection point 240 may continue during a preparation cycle, as well as in-between preparation cycles. The rate at which water treating agent is dispensed, as well as the concentration of agent 99 therein, will generally depend on the volume flow rate of the untreated water in source 200 passing the dispensing station defined at connection point 240. A particular amount of chemical agent 99 in the water treating agent will be effective in treating a particular volume V' of untreated water, and thus the greater the volume flow rate past the dispensing station, the greater the dispensing rate and/or concentration of chemical agent 99 in the water treating agent need to be.

Once the prepared control volume V of water treating agent is fully dispensed via pump 59, the system 100 prepares automatically a new batch, i.e., a new control volume V of water treating agent. The effective storage time for each prepared control volume V, i.e., the time between consecutive preparation cycles is thus dependent on the rate at which water is to be treated by the water treating agent, but for common, small drinking water plants based on system 100, this storage time may vary, for example, between 1 and 4 hours. According to one aspect of the invention, the magnitude of the control volume V of water treating solution is such that this storage time is well below the time taken for the agent 99 to lose its effectiveness, due to decomposition thereof in the aqueous environment of the water preparing solution, thus ensuring that the water treating agent is substantially fully effective in treating water downstream of the system 100 during the dispensing of the full control volume, and minimizes risks associated with handling the aqueous form of the chemical agent.

Thus, the system 100 ensures that the level of agent 99 concentration in the water treating solution which is dispensed by the system 100, and the purity of the water treated thereby, remains generally constant throughout the dispensing operation of the system 100.

The rate at which each control volume V of water treating solution is prepared can be controlled by varying the rate at which untreated water and agent 99 are provided to the device 20 during the preparation cycle. Thus, valve 217 and dosing device 66 may be controlled by control system 40 to prepare a control volume V in a shorter time or over a longer time, which may be coupled to the rate at which the water treating agent is being dispensed by the pump 59. In this connection, the effectiveness of the water treating agent in treating water downstream of connection point 240 may be monitored by a suitable monitoring system 400 (FIG. 1), for example comprising a water bypass circuit and chlorine concentration meter or the like, such as for example based on an oxidation reduction electrode. The monitoring system 400 monitors the level of residual chlorine in the source 200 downstream of the system 100. If it is found that the residual chlorine level is too strong or too weak, the rate at which the water treating agent (and thus the preparation rate for each preparation cycle) may be accordingly modified, and/or the concentration of agent 99 provided in each preparation cycle may be changed, manually or automatically, to bring the level of residual chlorine within acceptable parameters. Thus, the system 400 may be operatively connected to the control system 40, which in turn can be configured to operate the dispensing unit 95 according to the input provided by the monitoring system 400. Optionally, monitoring system 400 may be directly coupled to the pump 59 and controls the same to provide more water treating agent if the residual chlorine level is too weak, or less water treating agent if the level is too strong. As the dispensing of the water treating agent eventually results in the level in the vessel 30 dropping to $L_{max}$ and in the system 100 preparing a subsequent control volume of water treating agent, controlling the dispensing rate via pump 59 results in indirectly controlling the rate at which consecutive control volumes are prepared.

As previously mentioned, dispensing of the water treating agent from the system 100 can occur even during a preparation cycle, and can continue thus for the full preparation cycle if the dispensing volume flow rate is less than the rate at which the new control volume of water treating agent is being prepared by the system 100. Since the water treating agent is dispensed from the vessel 30, which during the preparation cycle is receiving concentrated water treating agent from the cyclone 52 and water from the inlet 32, which are yet to be fully and uniformly mixed, there may be small variations in the concentration of the water treating solution being dispensed during a preparation cycle. Nevertheless, this concentration remains within predetermined limits by controlling the relative dispensing and preparation rates of the water treating solution accordingly. The predetermined limits are such as to ensure that the water treating solution thus dispensed is always sufficiently potent or effective in treating or disinfecting the untreated water.

According to one embodiment, the halogen generating agent 99 comprises NaDCC in granulated form, and is dispensed into receiving chamber 54 at pre-defined doses to form a water treating agent comprising a solution of water with fixed concentration of the agent in the vessel 30.

By way of non-limiting example, and when using NaDCC as the agent 99, it is dosed into the receiving chamber 54 in an amount enabling the preparation of a control volume of water treating solution of about 5 to about 6 liter solution of a desired concentration in the vessel 30. The concentration of NaDCC in the water treating solution would preferably be between about 5% to about 20%, preferably about ca. 10%.

In any case, in each preparation cycle, a limited amount of water treating agent is prepared, i.e., a control volume V, compared with the volume of water actually treated over a period of days, weeks and so on, which amount to many times the magnitude of V. By preparing each time only relatively small volumes of water treating solution which are quickly dispensed to treat water, this minimizes any possible eventual changes in the water treating agent, when NaDCC is the chemical agent, due to the relative instability of these solutions.

At the same time, the bulk of the chemical agent in particulate form is maintained within container 90 in substantially dry conditions, and thus when the chemical agent comprises anhydrous halogen generating agent, such as NaDCC, this provides a safety feature to operation of the system.

Purging Cycle

A purging cycle may be activated by user initiation, for example, when wishing to disconnect, shutdown or service the system 100.

Tie purging cycle may be carried out manually, and the vessel 30 is drained and then thoroughly rinsed with water via inlet port 32.

Alternatively, the purging cycle may be automatically carried out: the control system first closes off untreated water ingress into the device 20, and continues to dispense water treating agent continuously via outlet 220, while the pump 80 is running and the container 90 is prevented from dispensing agent. Then, when the level of water in the vessel 30 reaches a particular threshold, which may be $L_{min}$ or lower for example, suitable sensors having advised the control system 40 of this, untreated water is again allowed into the device 20 to flush the same, and this can continue for a certain period, generally consistent with the objective. Eventually, ingress of water into the device 20 is again stopped, but dispensing of water is continued until the device 20 is emptied. Alternatively, the purging cycle may do away with the first step of closing the water inlet at the start, and instead also water to be introduced and removed therefrom at reasonable rates to ensure thorough flushing of the vessel 30, treatment subsystem 50, and any other required parts or components of the device 20, and after a time the water ingress is stopped, and the device drained. Herein, the device 20 has been described as being drained via the dispensing outlet 220 to a downstream part of the water source 200. Alternatively, though, a drain port (not shown) may be provided in the device 20 for draining the same to a different place.

DETAILED DESCRIPTION OF NON-LIMITING EXAMPLES

Example 1

NaDCC [CDB-56, Clearon Corp., USA] is used as the water treating agent in accordance with the water treating system described with respect to FIG. 1.

A water treating system in accordance with this particular example may be defined by the following parameters:

- it is designed so as to treat 150-300 $m^3$ water/hour with residual chlorine generated from NaDCC at an amount of 0.5-0.7 ppm (ca 1-1.2 ppm $NaDCC.2H_2O$ that contains 55.5% available chlorine).
- The hopper 95 containing the powder dosing device and knocker is mounted on a pre-packed package comprising 50 kg of dry granulated NaDCC and the resulting ensemble is then mounted on the special rack, above the vessel 30;
- for initiating the system 3-4 liters of fresh untreated water are introduced into the dispensing/storage vessel with approximately 4 liters being the $L_{min}$ in this particular, non-limiting example.
- at each preparation cycle 225 g of NaDCC per 2.25 l of water are introduced into the receiving chamber. Accordingly, for a 24 h/day operating water treating system a 50 kg NaDCC containing package should suffice for 10 days of water treating, and for a 16 h/day operating system, 50 kg package should suffice for supplying potable water for a duration of at least 14 days.
- when only 10 kg of NaDCC are remaining in the dispensing container as detected by a suitable sensor, such as a capacitive sensor or a weight sensor (not shown in FIG. 1) an alarm is set on to inform a servicing station that replacing or refilling of the dispensing container is required;

the desired concentration of NaDCC.2H$_2$O in the main water stream is ca. 1-1.5 ppm. In order to provide this concentration and considering that a ca. 10% solution should be prepared, the following hourly rates of components are set:

(i) NaDCC.2H$_2$O is fed into the vessel at a rate of 3.3 kg/h which is equivalent to dosing from the respective container for 12 seconds every 1 minute;(ii) Fresh water is fed into the main chamber at a rate of 30-35 l/h;

At these rates and at the dispensing rate required to maintain the residual chlorine concentration as shown, the level of water treating solution reaches $L_{max}$ in calculated 8 minutes.

Example 2

A water supply of 500 m$^3$/h is disinfected by addition of 2 ppm residual chlorine. The supply is active over a 6 hour period per 24 hours while during the remaining 18 hours, the system is on stand-by mode. Accordingly, during the active mode of the system, the hourly requirement of chlorine is 1 kg/h (2 mg/l or 2 g/m$^3$) or 1.8 kg/h NaDCC (i.e., just over 10 kg per day of NaDCC is used).

The concentration of the water treatment solution is maintained as in Example 1 (10% NaDCC). Thus, an hourly feed of the water treating agent of 18 l/h is supplied. For better performance, a supply of 4.4 kg/h NaDCC is set together with a 40-45 l/h water. As a result, a solution concentration of 10% is obtained. The volume of solution V being ca 6 liters, meaning that 3 cycles of preparation of water treating agent are needed every hour.

The 50 kg package is replaced, in the above conditions, after a calculated 4 or 5 working days (the supply rate is just over 10 kg/day, thus the package may be sufficient for a total of 4 to 5 days).

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed exemplary embodiments in accordance with the invention, it will be appreciated that many changes may be made therein without departing from the spirit of the invention.

The invention claimed is:

1. A system for treating water to provide potable water, comprising:
  a supply of chemical agent selected from halogen generating agents, the chemical agent being capable of treating untreated water to provide potable water when a water treating agent comprising an aqueous solution of the agent is interacted with untreated water;
  a supply of water;
  a water treating agent preparation and dispensing device connectable to an untreated drinking water source, the water treating agent preparation and dispensing device being configured for preparing discrete and consecutive control volumes of the water treating agent from the supply of water and the chemical agent, and for dispensing the water treating agent thus prepared from the water treating agent preparation and dispensing device to the untreated water source for enabling untreated water in the untreated water source to be treated thereby to provide potable water;
  wherein the water treating agent preparation and dispensing device is configured for preparing a next control volume of the water treating agent after a current control volume of the water treating agent has been dispensed thereby.

2. The system according to claim 1, wherein the system is configured for dispensing the water treating agent independently of whether a control volume thereof is being prepared or has been prepared, the water treating agent having a concentration of the chemical agent sufficient for treating a substantially larger volume of untreated water therewith to render the larger volume potable.

3. The system according to claim 1, wherein the system is configured for preparing consecutive control volumes of water treating agent at a rate, and for providing an amount of the chemical agent in each prepared control volume, correlated to a volume flow rate and level of impurity of untreated water that it is desired to treat.

4. The system according to claim 1, wherein a magnitude of the control volume is such as to enable the control volume to be dispensed within a dispensing time period that is generally less than a time period in which the the chemical agent decomposes in aqueous solution.

5. The system according to claim 1, wherein the halogen generating agent comprises one or more members selected from the group consisting of
  a chlorine generating agent;
  a free halogen generating agent;
  a chlorinated cyanurate selected from mono, di or trichloro isocyanurate;
  a chlorinated cyanurate selected from the group consisting of sodium dichloroisocyanurate (NaDCC), sodium dichloroisocyanurate dihydrate (NaDCC.2H2O), potassium dichloroisocyanurate (KDCC), trichloroisocyanuric acid (TCCA), and mixtures thereof; and
  a chlorinated cyanurate in the form of anhydrous or dihydrated NaDCC.

6. The system according to claim 1, wherein the system is configured for disinfecting water to provide disinfected water.

7. A device for providing a water treating solution, comprising:
  a vessel adapted for containing an aqueous liquid, vessel being operatively connectable to a supply of water and to a supply of chemical agent, the vessel comprising a treatment sub-system configured for interacting water provided thereto via the vessel with chemical agent provided directly to the sub-system responsive to the treatment sub-system being activated to provide a water treating solution therefrom to the vessel, and the vessel comprising a dispensing outlet; and
  a control system operatively connected to the vessel and configured for carrying out at least one preparation cycle for providing at least a dispensable control volume of water treating agent in the vessel responsive to a volume of water in the vessel being not greater than a minimum water volume, and for preventing ingress of untreated water to the vessel responsive to at least one of:
    a volume of water including water treating agent in the vessel being not less than a maximum water volume, and
    a preparation cycle being terminated, the control volume being defined by a difference between the maximum water volume and the minimum water volume;
  wherein during the or each preparation cycle the control system is configured to allow ingress of water and of a selectively controllable dose of the chemical agent into the device and for activating the treatment sub-system, each in sufficient quantity such as to provide a control volume of water treating agent of desired concentration.

8. The device according to claim 7, wherein the device is configured for dispensing the water treating agent independently of whether a control volume thereof is being or has been prepared, the water treating agent having a concentration of chemical agent sufficient for treating a substantially larger volume of untreated water therewith to render the larger volume potable, and wherein optionally the control system is configured for carrying out a plurality of preparation cycles in a consecutive manner, wherein a next preparation cycle is activated when a the control volume of water treating agent prepared by a previous preparation cycle has been dispensed, and wherein optionally the dispensing outlet is connectable to a water distribution network.

9. The device according to claim 7, wherein the vessel comprises a main chamber for dispensing therefrom water treating agent via the dispensing outlet, and wherein the treatment sub-system comprises a receiving chamber for receiving the dose of chemical agent during each preparation cycle, the receiving chamber being in fluid communication with the main chamber, wherein optionally the receiving chamber is accommodated within the main chamber.

10. The device according to claim 7, wherein the treatment sub-system comprises a mixing arrangement in fluid communication with the receiving chamber configured for at least one of dispersing and dissolving the dose of the chemical agent with water during each preparation cycle, and a pump for pumping water treated by the mixing arrangement to the main chamber.

11. The device according to claim 7, further comprising a dispensing mechanism reversibly connectable to a suitable supply of the chemical agent, and configured for delivering a metered dose of chemical agent to the vessel responsive to the dispensing mechanism being activated via the control system, wherein optionally the dispensing mechanism comprises a dispensing mechanism outlet that may be coupled with the vessel at least during a preparation cycle, and wherein further optionally the dispensing mechanism outlet is coupled with the receiving chamber.

12. A system for providing potable water, comprising:
a supply of water;
a device as defined in claim 7; and
a container configured for holding a supply of the chemical agent in substantially dry conditions, and configured for reversibly coupling to the dispensing mechanism;
wherein the device is operatively connected to the supply of water and to the supply of chemical agent.

13. The system according to claim 12, wherein the container is configured for holding and providing the chemical agent in any one of: a substantially dry form, a granular form, a pellet form, a particulate form, and a powder form.

14. The system according to claim 12, wherein the container further comprises a quantity of the chemical agent, and wherein the chemical agent comprises one or more members selected from the group consisting of
a halogen generating agent;
a chlorine generating agent;
a free halogen generating agent;
a free chlorine generating agent;
a chlorinated cyanurate selected from mono, di or trichloro isocyanurate;
a chlorinated cyanurate is selected from the group consisting of sodium dichloroisocyanurate (NaDCC), sodium dichloroisocyanurate dihydrate (NaDCC.2H2O), potassium dichloroisocyanurate (KDCC), trichloroisocyanuric acid (TCCA), and mixtures thereof; and
a chlorinated cyanurate in the form of anhydrous or dihydrated NaDCC.

15. The system according to claim 12, wherein the system is configured for selectively altering the magnitude of the dose of the chemical agent provided to the vessel in each preparation cycle.

16. A method for providing disinfected or potable water, comprising:
providing a supply of water and a supply of chemical agent selected from halogen generating agents;
preparing discrete and consecutive control volumes of water treating agent prepared from the supply of water and the chemical agent, and dispensing the water treating agent thus prepared to an untreated water source, a concentration of the chemical agent in the water treating agent being sufficient for enabling a predetermined volume of untreated water in the untreated water source to be treated, thereby to provide disinfected or potable water;
wherein a next control volume of the water treating agent is prepared after a previous control volume of the water treating agent has been dispensed.

17. The method according to claim 16, comprising preparing consecutive control volumes of water treating agent at a rate, and with an amount of the chemical agent in each prepared control volume, that are correlated to a magnitude of the predetermined volume and to a level of impurity of untreated water that it is desired to treat.

18. The method according to claim 16, wherein a magnitude of the control volume is such as to enable the control volume to be dispensed in a dispensing time period that is less than a time period in which the chemical agent decomposes in aqueous solution.

19. The method according to claim 18, wherein the chemical agent is provided at a concentration so as to provide a residual amount thereof in the potable water in the range of from about 0.1 ppm and to about 5 ppm.

20. The method according to claim 16, wherein the halogen generating agent is selected from the group consisting of
a chlorine generating agent;
a free halogen generating agent;
a compound of the general formula (I):

(I)

wherein
X, which may be the same or different within a single compound and represents a halogen or hydrogen,
W, represents O,
and salts and tautomers of the formula;
a halogenated cyanurate;
a chlorinated cyanurate selected from mono-, di or trichloro isocyanurate
a chlorinated cyanurate selected from the group consisting of sodium dichloroisocyanurate (NaDCC), sodium dichloroisocyanurate dihydrate (NaDCC.2H2O), potassium dichloroisocyanurate (KDCC), trichloroisocyanuric acid (TCCA) and mixtures thereof; and a chlorinated cyanurate in the form of anhydrous or dihydrated NaDCC.

21. The method according to claim 19, wherein the chemical agent is provided at a concentration so as to provide a residual amount thereof in the potable water in the range of from about 0.5 ppm and to about 3 ppm.

* * * * *